US006920144B2

(12) United States Patent
Niermann

(10) Patent No.: US 6,920,144 B2
(45) Date of Patent: Jul. 19, 2005

(54) METHOD, SYSTEM AND SIGNALING GATEWAYS AS AN ALTERNATIVE TO SS7 SIGNAL TRANSFER POINTS

(75) Inventor: Dennis Niermann, Richardson, TX (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 825 days.

(21) Appl. No.: 09/808,677

(22) Filed: Mar. 15, 2001

(65) Prior Publication Data

US 2002/0131427 A1 Sep. 19, 2002

(51) Int. Cl.[7] .............................................. H04L 12/66
(52) U.S. Cl. ..................................... 370/401; 370/467
(58) Field of Search ................................ 370/352, 353, 370/354, 355, 356, 401, 465, 466, 467; 379/221.08, 221.09, 221.1, 221.11, 221.12

(56) References Cited

U.S. PATENT DOCUMENTS

| 6,324,183 B1 | * | 11/2001 | Miller et al. | ................ | 370/467 |
| 6,411,632 B2 | * | 6/2002 | Lindgren et al. | ........... | 370/466 |
| 6,515,985 B2 | * | 2/2003 | Shmulevich et al. | ....... | 370/356 |
| 6,529,524 B1 | * | 3/2003 | Liao et al. | .................. | 370/467 |
| 6,611,533 B1 | * | 8/2003 | Liao et al. | .................. | 370/467 |

FOREIGN PATENT DOCUMENTS

| GB | 2369749 A | 6/2002 |
| WO | WO 00 51395 A | 8/2000 |
| WO | WO 00 79807 A | 12/2000 |
| WO | WO 01 6743 A | 1/2001 |

OTHER PUBLICATIONS

Mousseau et al., Network Working Group, Internet Draft, "SS7 MTP3–User Adaptation Layer (M3UA)", Feb. 2001; http://www.ietf.org/proceedings/01mar/l–D/sigtran–m3ua–06.txt.*

Jungmaier A and Al.: "Performance Evaluation of the Stream Control Transmission Protocol" High Performance Switching and Routing, 2000. ATM 2000, Jun. 26–29, 2000, pp. 141–148, XP002206655 Heidelberg (Germany) the whole document.

Jungmaier A et al: "SCTP—A Multi–Link End–to–End Protocol for IP–Based Networks" AEU International Journal of Electronics and Communications, Gustav Fisher Verlag, Jena, DE, vol. 55, No. 1, Jan. 1, 2001, pp. 46–54, XP001001959 ISSN: 1434–8411 p. 47, paragraph 2.1.

* cited by examiner

Primary Examiner—Kwang Bin Yao

(57) ABSTRACT

A system for routing Signaling System 7 (SS7) signaling traffic over an Internet Protocol (IP) network includes two or more signaling points, each signaling point capable of sending and receiving SS7 signaling traffic over an SS7 network and a first Signaling Gateway (SG) adapted for receiving SS7 signaling traffic from a first signaling point over the SS7 network. The first SG is configured to convert SS7 signaling traffic into an IP message stream and to route the IP message stream on the IP network to a second SG. The second SG is configured to receive the IP message stream via peer-to-peer IP communications over said IP network with said first SG and to recover the SS7 signaling traffic from the IP message stream. Peer-to-peer communications between the first and second SG is supported by conversion layers within the SG, in the form of an SCTP and M3UA protocols that allows peer IP signaling between the two SGs.

31 Claims, 3 Drawing Sheets

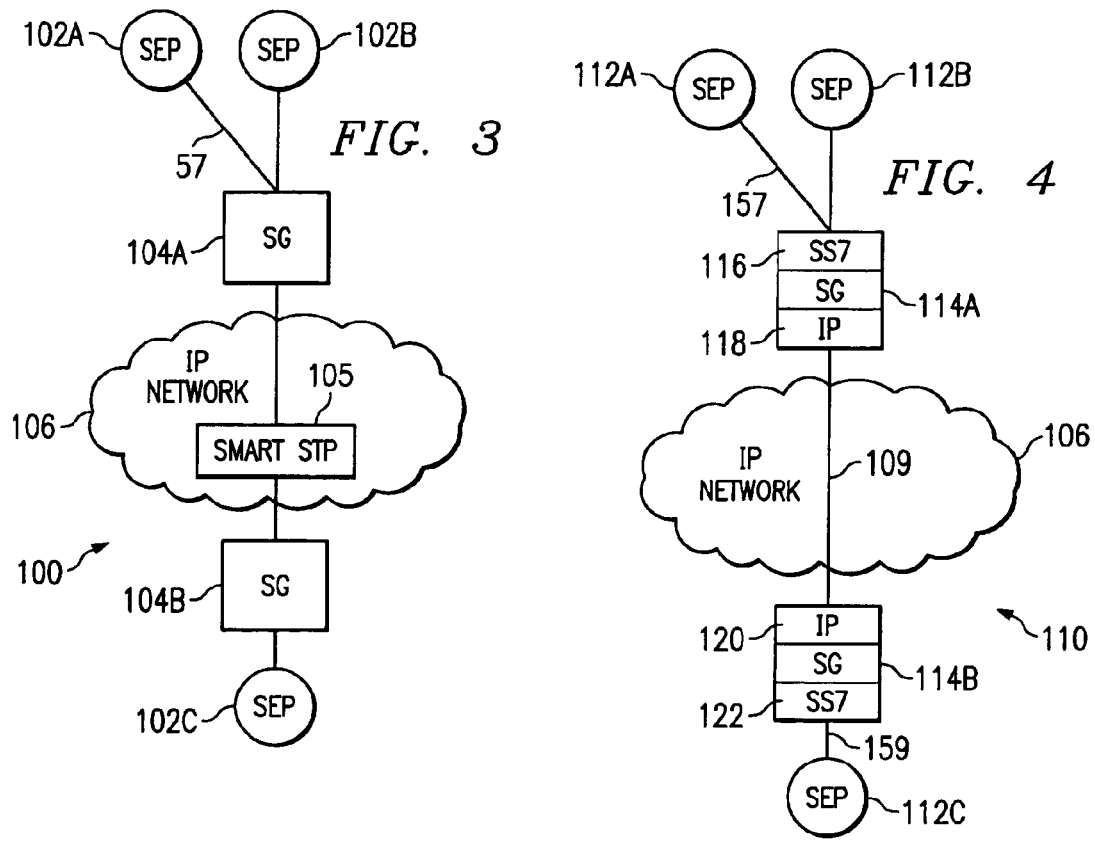
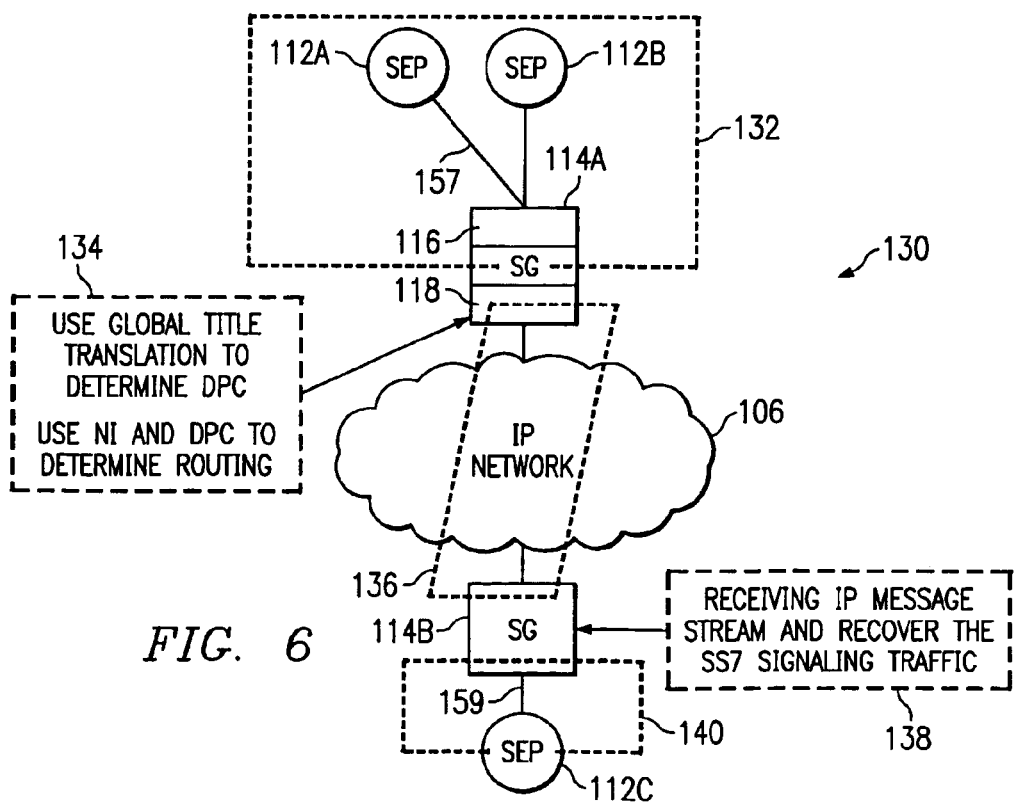

METHOD, SYSTEM AND SIGNALING GATEWAYS AS AN ALTERNATIVE TO SS7 SIGNAL TRANSFER POINTS

TECHNICAL FIELD

The present invention relates generally to communications using Internet Protocol (IP) for Signaling System 7 (SS7) signaling traffic and more specifically to the transportation of SS7 signaling traffic over an IP-based network. More specifically, the present invention relates to the use of signaling gateways capable of utilizing the IP backbone network as an alternative to traditional SS7 signal transfer points and an SS7 backbone network.

BACKGROUND OF THE INVENTION

Internet Protocol (IP) has become a popular communications standard enjoying wide-scale deployment and use. For example, the Internet is now a worldwide network of communications equipment and service providers which use IP as a common signaling protocol for communicating. On the Internet, messages are transmitted from one user to another over a vast infrastructure of routers, servers, gateways and communication devices. Typically, users on either end of the network operate computers equipped with appropriate software and equipment. The underlying link level protocols handle the messaging functions on both ends of the communication channel.

Transmission Control Protocol/Internet Protocol (TCP/IP) is a connection-oriented transport layer protocol that uses IP as its underlying networking protocol. TCP governs the exchange of sequential data, while IP routes outgoing and recognizes incoming messages. TCP has recently been joined by Stream Control Transmission Protocol (SCTP) as a transport protocol for telephony applications.

The widespread use of IP as a networking protocol has led to an intense push for the integration of IP-based services with other networks such as common channel signaling systems, asynchronous transfer mode networks, and wireless. A form of common channel signaling is channel signaling system number 7 (SS7 or C7) which is a global standard for telecommunications defined by the International Telecommunication Union (ITU) and specifically the Telecommunications Standardization Section of the ITU (ITU-T). While IP networks communicate using flexible and easily modifiable connections, SS7 uses a dedicated network to carry signaling traffic. In essence, the SS7 standard defines the procedures and protocols by which network elements in the public switch telephone network (PSTN) exchange information over a digital signaling network including wireless (e.g. cellular), and wireline call setup, routing and control. The ITU definition of SS7 allows for variance of the procedures and protocols such as those promulgated by the American National Standards Institute (ANSI) and Bell Communications Research (Bellcore) standards used in North America as well as the European Telecommunication Standards Institute (ETSI) standards used in Europe.

Essentially, an SS7 network and the defined protocols are used for implementing call signaling functions including basic call setup management and tear down. In addition, SS7 specifies various wireless services such as personal communication services (PCS), wireless roaming and mobile subscription authentication. Recently, the SS7 protocol has been used for local number portability (LNP) as well as toll free and toll wireline services. Other services that benefit from the SS7 protocol include enhanced call features such as call forwarding, calling party name and number display and three way calling as well as a wide array of emerging applications standards that provide for efficient and secure worldwide telecommunication.

With an SS7 network, messages are exchanged between network elements over 56 or 64 kilobits per second (kbps) using bi-directional channels called signaling links. Signaling occurs-out-of-band on dedicated channels rather than in-band on voice channels. Compared to in-band signaling, out-of-band signaling provides faster call setup times, more efficient use of voice circuits, and support for intelligent network services which require signaling to network elements without voice trunks. In addition, out-of-band provides for improved control over fraudulent network use. These advantages have made the SS7 protocol a popular choice for telephony.

The hardware and software functions of the SS7 protocol are divided into functional abstractions called levels. These levels map loosely to the Open Systems Interconnect (OSI) 7-layer model defined by the International Standards Organization (ISO). An Integrated Services Digital Network (ISDN) user part (ISUP) defines the protocol used to setup, manage and release trunk circuits that carry voice data between terminating line exchanges, e.g., between a calling party and a called party.

Currently, SS7 requires a dedicated network to handle the transport of signaling traffic. Some effort has been made to try to utilize other network resources, like an IP-based network, for transferring SS7 signaling traffic in an attempt to offer load sharing and save costs associated with deploying and utilizing a specialized, dedicated network. The internetworking between SS7 signaling traffic and IP is provided by a gateway that includes the conversion mechanism between the two protocols.

One such solution is offered by the company Tekelec which manufactures and sells a gateway capable of communicating SS7 signaling traffic over an IP network. The Tekelec product uses a proprietary signaling protocol known as Transport Adapter Level Interface (TALI) that is designed to use standard TCP as the transport layer. In addition, the Tekelec solution requires a smart STP to properly route SS7 signaling traffic over the IP network. This requires that traffic be routed to an intermediary node in the IP network resulting in an additional hop for messages to reach their destination.

Thus, with prior art SS7/IP signaling mechanisms, a message must first go from an origination Signaling Gateway (SG) on the edge of the IP network to a "smart" Signal Transfer Point (STP). The SG transports the SS7 message to the STP using IP and the STP interprets the SS7 message and routes it to its destination. Thus, the smart STP routes the message to a destination Signaling Gateway at the border of the IP network which recovers the SS7 signaling traffic from the IP message stream. Thus, since a dedicated conversion node is needed, the signal traffic must traverse an extra hop in the transmission pathway resulting in unnecessary delay and complexity of a dedicated network path and conversion node. Moreover, the use of a proprietary IP protocol, such as TALI, is disadvantageous since it limits inter-networking between equipment not supporting the protocol in the network.

Accordingly, a way of routing SS7 signaling traffic over IP that is free of proprietary protocols and that eliminates the need for a dedicated conversion node would provide numerous advantages.

SUMMARY OF THE INVENTION

The present invention provides a method, system and device, in the form of a signaling gateway, that permits the routing of SS7 signaling traffic over an IP network and eliminates the use of a dedicated traffic conversion path and node. With the present invention, an IP backbone can be used for transmission of SS7 signaling traffic from an originating SG to a destination SG without an intermediary SS7-knowledgeable hop and without the use of proprietary conversion protocols.

According to one embodiment of the invention, disclosed is a method of routing Signaling System 7 (SS7) signaling traffic over an Internet Protocol (IP) network. The method comprises the steps of a first signaling gateway (SG) receiving SS7 signaling traffic from a first signaling point. Next, the first SG transfers the signaling traffic over the IP network by routing the signaling traffic in an IP message stream to a second SG supporting peer-to-peer communications with the first SG over the IP network. Finally, the second SG receives the IP message stream and recovers the SS7 signaling traffic from the IP message stream. Peer-to-peer communications between the first and second SG is supported by conversion layers within the SG, in the form of an SCTP and M3UA protocols that allows peer IP signaling between the two SGs. The first SG may transfer the signaling traffic by routing the signaling traffic a Network Indicator (NI) and a Destination Point Code (DPC) to determine how to best route the signaling traffic. Global title translation can be used to reveal the DPC of the signaling traffic.

According to a second embodiment, disclosed is a signaling gateway for routing Signaling System 7 (SS7) signaling traffic over an Internet Protocol (IP) backbone. The signaling gateway comprises an SS7 interface to an SS7 signaling link and an IP interface to an IP signaling link. Conversion means between the SS7 interface and the IP interface allow conversion of SS7 signaling traffic received from the SS7 signaling link to IP traffic suitable for transmission over the IP signaling link. The conversion means comprises SS7 to IP conversion layers in the form of Stream Control Transmission Protocol (SCTP) and Message Transfer Part 3-User Adaptation Layer (M3UA) protocols layers which permit routing of SS7 signaling traffic over the IP signaling link based on the Network Indicator and Destination Point Code (DPC) of said traffic. The signaling SS7 to IP conversion may also include an SCCP protocol layer which allow global title translation of SS7 signaling traffic in order to reveal the DPC.

Further disclosed is a system for routing SS7 signaling traffic over an IP backbone. The system comprises a first signaling gateway (SG) configured to convert SS7 signaling traffic into an IP message stream and a second SG configured to recover SS7 signaling traffic from an IP message stream. The system further comprises an IP link providing a signaling channel between the first SG and the second SG. The SGs are configured so that the first SG and second SG are in peer-to-peer communication over the IP network and so that the first SG and second SG are capable of transferring SS7 signaling traffic via an IP interface by converting SS7 signaling traffic into an IP message stream. The SGs can be configured to use a Network Indicator (NI) and a Destination Point Code (DPC) to determine how to route said signaling traffic and can use global title translation to determine the DPC. Point code conservation may be permitted by having the first and second SG share the same DPC.

A technical advantage of the present invention is that it allows a telecommunications provider to send signaling traffic off band over an existing IP network. This allows the provider additional flexibility and bandwidth as it eliminates the requirement for a dedicated transit switch to handle the signaling traffic.

Another technical advantage of the present invention is that it allows direct connections between a pair of SGs on the edge of an IP network without the need to go through an intermediary node with SS7 routing intelligence.

BRIEF DESCRIPTION OF THE DRAWINGS

The above features and advantages of the present invention will be more clearly understood from consideration of the following detailed description in connection with the accompanying drawings in which:

FIG. 3 depicts a signaling gateway using an IP network of the prior art;

FIG. 4 illustrates use of signaling gateways to transfer signaling traffic over an IP link, according to an embodiment of the present invention.

FIG. 6 illustrates a system for routing SS7 signaling traffic over an IP network, according to an embodiment of the present invention; and Corresponding numerals and symbols in the different figures refer to corresponding parts unless otherwise indicated.

DETAILED DESCRIPTION OF PREFERRED EMBODIMENTS

Figure 1:
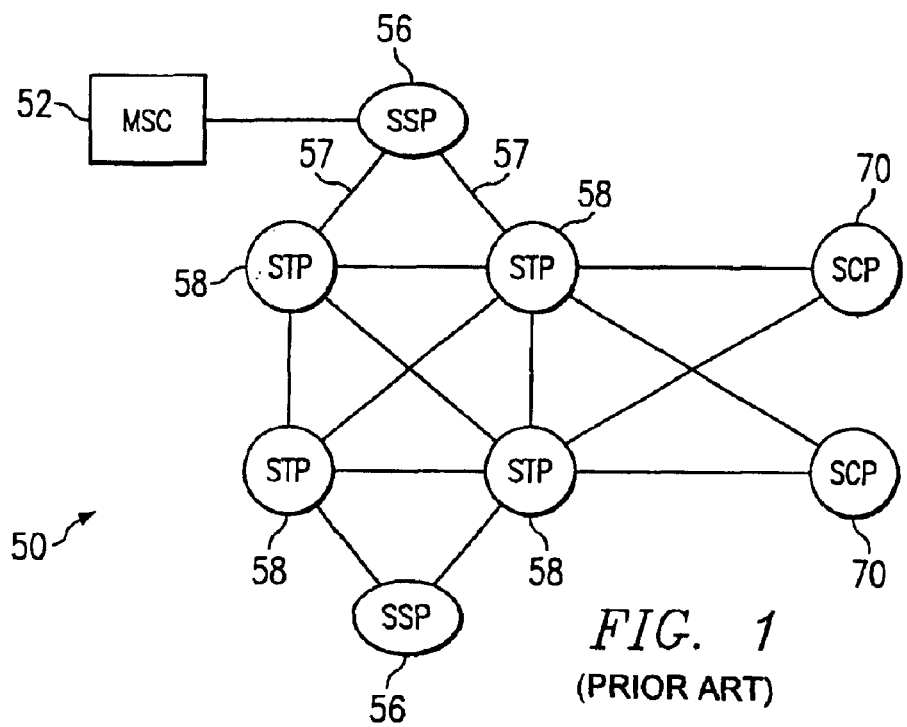
FIG. 1 illustrates a typical SS7 network of the prior art.

Referring to FIG. 1, a node diagram of a typical channel signaling system number 7 (SS7) network 50 is shown. Service Switching Points (SSP) 56 comprises SS7 data traffic switches between an end network and the SS7 network. For example, SSP 56 can provide an interface between a telecommunications switch such as a Mobile Switching Center (MSC) 52 and other nodes of the SS7 network 50. Signaling Transfer Points (STP) 58 are used for routing SS7 signaling traffic in the network 50 as well as routing from one node to another node of the SS7 network 50 eliminating the need for direct links between every pair of signaling points in the network. Since the traffic can originate from various end networks, an specific STP 58 may perform global title translation, a procedure by which a destination point code is revealed from the incoming traffic stream, to determine the destination of the traffic. Other functions may also be provided by the STP 58, such as stream control, failure recovery and rerouting as is well known in the arts.

The SSPs 56 are switches that originate and terminate as tandem calls. Thus, an individual SSP sends signaling traffic to other SSPS for setup, management and release of voice circuits required to complete a call. An SSP may also send a query message to a centralized data base such as the Service Control Point (SCP) 70 to determine how to route a call, e.g., a toll free number calling in North America. The SCP 70 sends a response to the originating SSP 56, for example, containing the routing numbers associated with a dialed number. An alternate routing number may be used by the SSP 56 if the primary number is busy or the call is unanswered within a specified time. Actual call features vary from network to network and from service to service. Network traffic between signaling points may be routed STP 58. An SSP 56 is coupled to the STP 58 through one or more SS7 links 57. In operation, the STP 58 routes each incoming message to an ongoing signaling link based on routing information contained in the SS7 signaling traffic.

Because the SS7 network 50 is widely utilized for call switching, the STP 56 and STP 58 are usually deployed in mated pair configurations. Typically, pairs of elements are located in separate physical locations to assure network wide service in the event of an isolated failure. The SS7 links 57 between signaling points 56, 58 can also be provisioned in pairs. Traffic is shared across all links in the link set and if one of the links fails the signaling traffic is rerouted over another link in the link set. The SS7 protocol provides both error correction and retransmission capabilities to allow continued service in the event of signaling point or link failures.

Figure 2:
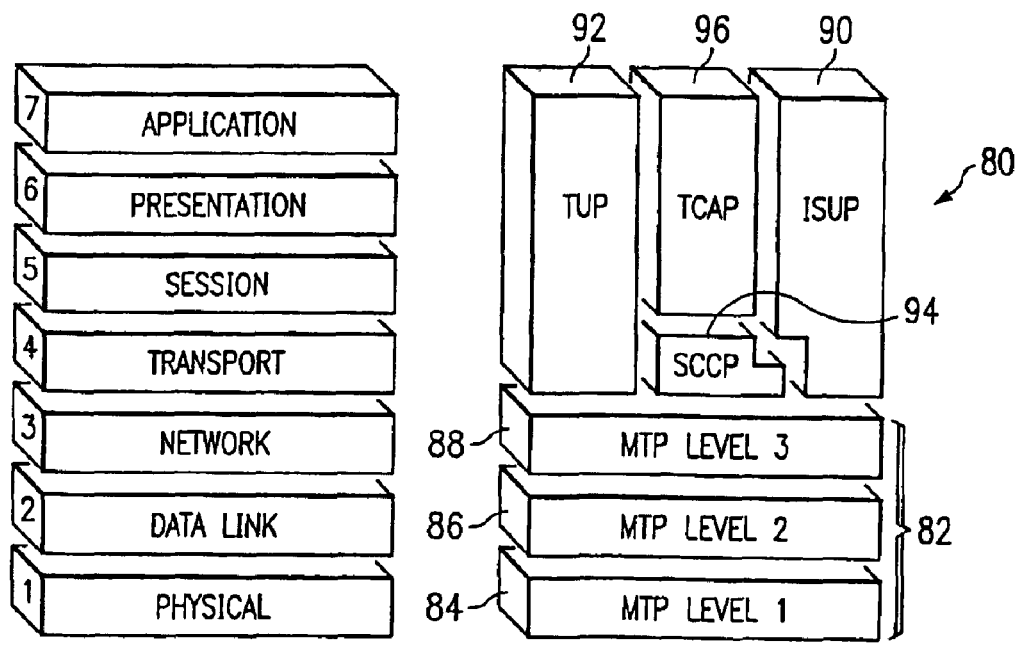
FIG. 2 illustrates an SS7 protocol stack of the prior art along side the OSI reference model.

With reference to FIG. 2, therein is shown the SS7 protocol stack 80 aside the OSI reference model. The message transfer part (MTP) layer 82 is divided into three levels. The lowest level, MTP level one 84 is equivalent to the OSI physical layer and defines the physical, electrical and functional characteristics of the digital signaling link. Next, MTP level two 86 ensures accurate end-to-end transmission of a message across a signaling link. In essence, the MTP level two 86 implements flow control, message sequence validation and error checking so that when an error occurs on a signaling link, the message (or set of messages) is retransmitted. As indicated in FIG. 2, the MTP level two 86 is equivalent to the OSI data link layer.

The final layer of MTP 82, MTP level three 88 provides message routing between signaling points 58 in the SS7 network 50. MTP level three 88 reroutes traffic away from failed links and controls traffic when congestion occurs. MTP level three 88 functions as the OSI network layer of the OSI reference model.

The ISUP layer 90 of the SS7 protocol stack 80 defines the protocol used to setup, manage and release trunk circuits that carry voice and data between terminating line exchanges, e.g., between a calling party and a called party. The ISUP layer 90 is used for both ISDN and non-ISDN calls. However, calls that are originate and terminate at the same switch do not use ISUP signaling. The protocol stack 80 also includes a telephone user part (TUP) layer 92 which supports basic call setup and tear down functions in some parts of the world. The TUP layer 92 handles analog circuits only and in some countries, the ISUP layer 90 has been used to replace TUP layer 92 for call management.

A signal link connection control part (SCCP) 94 provides connection-less and connection-oriented network services and global title translation capabilities above the MTP level three 88. A global title is an address, e.g., a dialed 800 number, calling card number, or mobile subscriber identification number, which is translated by the SCCP layer 94 into a destination point code (DPC) and subsystem number. A subsystem number uniquely identifies an application at the base destination signaling point. The SCCP layer 94 is used as a transport layer for TCAP based services.

The final part of the SS7 protocol stack 80 includes the transaction capabilities application part (TCAP) 96 which supports the exchange of noncircuit related data between applications across the SS7 network 50 and the SCCP 94 connectionless service. As such, queries and responses sent between the SSP 56 and the SCP 70 (FIG. 1) are carried in a TCAP message. For example, an SSP 56 sends a TCAP query to determine the routing number associated with the dialed number and to check the personal identification number of a calling card user. In mobile networks (IS-41 and GSM), TCAP 96 carries mobile application part messages sent between mobile switches and data bases to support user authentication equipment identification and roaming.

Having described the essential elements of an SS7 network 50 and the SS7 signaling protocol 80, reference is now made to FIG. 3 which illustrates the use of an IP-based network for routing SS7 signaling traffic. As mentioned, the use of an IP backbone for transmission of SS7 signaling traffic provides efficiencies in terms of network costs of operation since it eliminated the need to have a separate signaling network just for the SS7 traffic. In FIG. 3, a communications system utilizing IP to transfer SS7 signaling traffic is shown and denoted generally as 100. Signaling End Points (SEP) 102A sends SS7 signaling traffic via SS7 link 57 to a signaling gateway 104A. Next, signaling gateway 104A sends the traffic to STP 105 within the IP network 106 by encapsulating the SS7 message into an IP-based message. The STP 105 includes functionality for determining how to route the traffic in an IP message stream that allows the traffic to reach its destination. Thus, the STP 105 determines proper routing for the signaling traffic and sends it to SG 104B. SG 104B then sends the routing on its way to signaling end point 102C.

Thus, communications between SG 104a and 104B over IP network 106 must go through STP 105. The use of STP 105 adds additional hop with SS7 knowledge in the transmission path and prohibits direct transmission of SS7signaling traffic in the IP network 106 from the originating SG 104A to the destination SG 104B. Furthermore, since STP 105 determines the outgoing route, IP is being used as a transport mechanism rather than a routing mechanism on the IP network 106 resulting in inefficient use of the IP network 106. Moreover, in order to provide the conversion and route determination functions, STP 105 is equipped with a proprietary protocol that requires the use of protocol compliant devices at the STP 105 as well as other nodes in the network 100 that must recognize the STP 105. Therefore, for these and other reasons the use of STP 105 for routing SS7 signaling traffic is disadvantageous.

Referring to FIG. 4, a system for routing Signaling System 7 (SS7) signaling traffic over an Internet Protocol (IP) according to the invention is shown and denoted generally as 110. System 110 includes SEP 112A connected via SS7 link 157 to SG 114A. SG 114A has an SS7 interface 116 which allows it to receive information from nodes in an SS7 network, such as SEP 112A and SEP 112B. In addition, SG 114A includes has an IP interface 118 which allows it to communicate over IP link 109. SG 114B provides a gateway to the SS7 traffic destination point and likewise includes an IP interface 120 which allows it to communicate over IP link 109 in peer-to-peer communications with signaling gateway 114A. In this way, direct communications between a pair of SGs, such as SG 114A and SG 114B, is provided.

SG 114B is capable of receiving an IP message stream directly from SG 114A without passing through an intermediary node, such as STP 105. The destination SG 114B then recovers SS7 signaling traffic from the IP messaging stream and sends it over SS7 link 159 to SEP 112C. Thus, SG 114a and 114B are in direct communication over IP link 109 and no intermediate steps or nodes are required to successfully transfer the SS7 signaling traffic over the IP link between SG 114a and 114B.

Thus, the present invention achieves technical advantages as a method, system and signaling gateway for permitting peer-to-peer IP communications between two SGs on the edge of an IP network, such as IP network 106. Preferably, the SGs 114A, 114B are equipped with conversion means, in the form of protocol conversion layers that allow them to receive SS7 signaling traffic from a node in an SS7 network, convert the traffic into corresponding IP formatted messages or IP message stream, and transmit the IP message stream within the IP network using IP to achieve the routing. This lead to an efficient use of the IP backbone and protocol and eliminates the need for a dedicated network to carry the SS7 signaling traffic.

Figure 5:
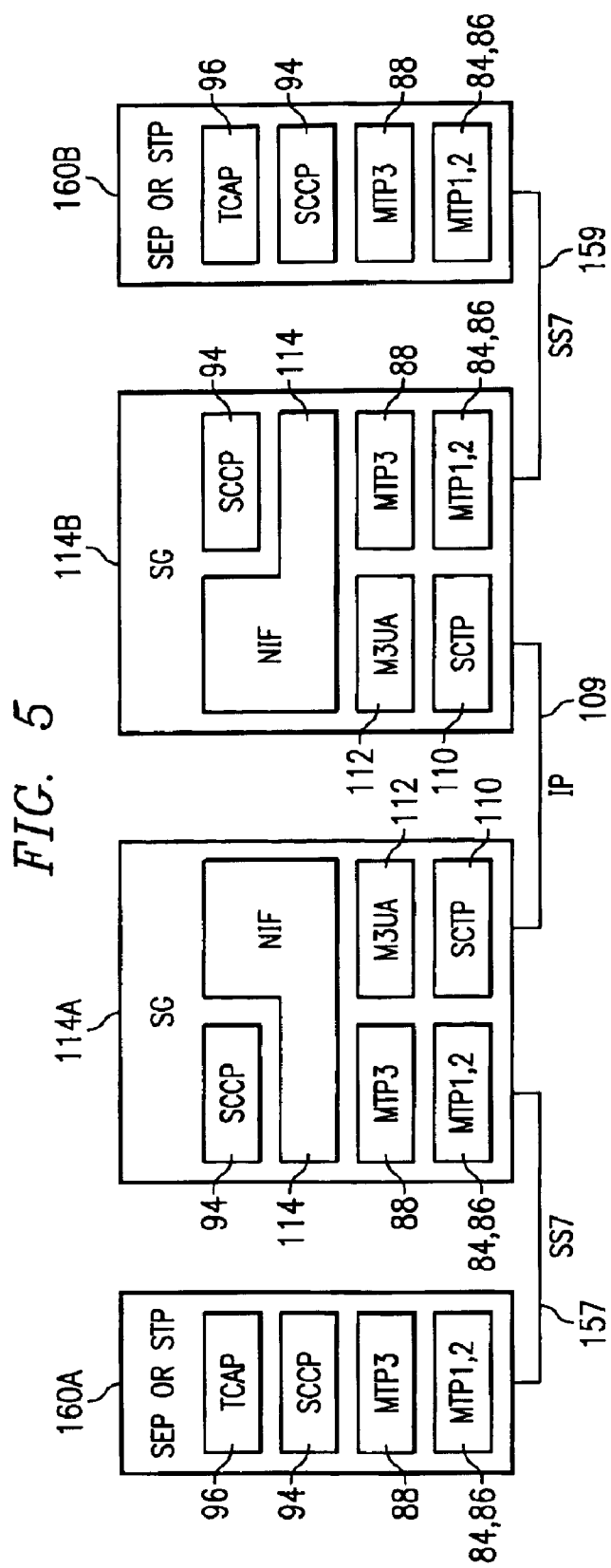
FIG. 5 shows the protocol stacks to implement the invention, according to the preferred embodiment.

In FIG. 5, the SS7-to-IP conversion means within the SGs 114A, 114B is shown in more detail. Essentially the conversion means comprises a set of conversion layers or protocol layers within the SGs 114A, 114B that permit direct peer-to-peer communications between the SGs 114A, 114B. Essentially, the protocol layers provide the SS7 interface and the IP interface within the SGs.

As shown, SS7 signaling traffic is transmitted by a first STP or SEP 160A to a first SG 114A. Within the STP/SEP 160A, the TCAP layer 96, SCCP layer 94, MTP3 layer 98, a MTP2 layer 96, and a MTP1 layer 84 are applied to the traffic according to well known protocol standards. The signaling traffic then proceeds through an SS7 link 157 and into SG 114A. SG 114A receives the SS7 signaling traffic and applies MTP1 layer 84, MTP2 layer 86, a MTP3 layer 88, optionally uses SCCP layer 94, Nodal Interworking Function (NIF) layer 114, MTP3-User Adaptation Layer (M3UA) 112 and Stream Control Transmission Protocol (SCTP) 110 as appropriate. Alternatively, the STP/SEP 160A may utilize ISUP or TUP. NIF Layer 114 within SG 114A serves as the interface between the MTP3 layer 88 and M3UA layer 112. NIF layer 114 has no visible peer protocol within STP 58 but provides network status information to one or both sides of the network.

SCTP 110 is familiar to those skilled in the art. SCTP is a specialized transportation protocol that has been developed for communications applications. SCTP 110 is designed to take the place of TCP, which is commonly used in Internet transactions across an IP network. M3UA 112 is a protocol that supports the transport of any SS7 MTP3-User signaling (e.g., SCCP messages) over an IP network using the services of the SCTP layer 110. Additionally, M3UA layer 112 contains protocol elements enabling a seamless operation of the MTP3-User peers in the SS7 and IP domains. M3UA layer 112 is designed to be used between a SG, such as SG 114A, and a Media Gateway Controller (MGC) or IP-resident Database. The invention takes advantage of this feature of M3UA to permit IP-enabled end nodes that conform to M3UA/SCTP protocol to inter-operate within the IP network and to support communications over the IP link 109. Thus, the fact that SGs 114A, 114B include M3UA layer 112 ad SCTP layer 110 provides a mechanism for peer-to-peer communications over IP link 109.

FIG. 6 illustrates the routing of SS7 signaling traffic over an IP network 106 and in a communication system 130 employing SGs 114A and 114B, according to one embodiment of the invention. On the origination end 132, a first SG 114A receives SS7 signaling traffic from a first signaling point, either SEP 112A or SEP 112B. In the simplest case, the SG 114A will route the traffic it receives from its SS7 interface 116 using the Network Indicator (NI) and Destination Point Code (DPC) of the traffic. In this case, the SCCP layer 94 is not used with only the SCTP layer 110 associations used for passing the traffic between the pair of SGs 114A, 114B. The SCTP layer 110 associations may also be used to pass management related messages between the SGs 114A, 114B such as messages related to destination availability.

If necessary, the SCCP layer 94 can be used to support global title translation as shown in block 134. In this case, the SG 114A will make use of the SCCP layer 94 and translate the incoming SS7 signaling traffic in order to reveal its DPC. Thereafter, the SS7 signaling traffic is routed according to its destination. Thus, the SG 114A applies global title translation to determine the destination point code, then it uses the network identifier and the DPC to determine how to route the SS7 signaling traffic. Then, at block 136, SG 114A sends the SS7 signaling traffic in an IP messaging stream across IP network 106 to SG 114B. In block 138, the destination SG 114B receives the IP message stream and recovers the SS7 signaling traffic. At block 140, SG 114B sends the SS7 signaling traffic to signaling end point 112B over a SS7 signaling link 159.

Advantages of the system, method and signaling gateway of the present invention are numerous and include the elimination of an intermediary conversion or "smart" STP that determines how to route the SS7 signaling traffic. Since peer-to-peer communications between a pair of SGs is provided, efficient use of the IP network is achieved. Moreover, the routing of SS7 signaling traffic over an IP network is achieved without the use of proprietary signaling protocols since SCTP and M3UA are explicitly described in known specifications. This permits devices supporting M3UA 112, SCTP 110 and IP to interact in the SS7IP network 106 without using a dedicated SG. The invention takes advantage of these protocols by equipping a pair of SGs on the border of an IP network with these protocols allowing inter-networking between the pair.

Additional advantages of the invention are the ability to support global title translation and conserve point codes since each SG 114A, 114B (as well as others) can be assigned the same SS7 point code.

While the invention has been described with reference to illustrative embodiments, this description is not intended to be construed in a limiting sense. Various modifications and combinations of the illustrative embodiments as well as other embodiments of the invention will be apparent to persons skilled in the art upon reference to the description.

What is claimed is:

1. A method of routing Signaling System 7 (SS7) signaling traffic over an Internet Protocol (IP) network comprising the steps of:

a first signaling gateway (SG) receiving SS7 signaling traffic from a first signaling point;

converting said SS7 signaling traffic to an IP message stream utilizing protocol conversion layers, wherein said conversion layers include transaction capabilities application part (TCAP), message transfer part 1 (MTP1), MTP2, and MTP3 Message Transfer Part 3-User Adaptation Layer (M3UA) to a second signaling gateway, wherein the second SG receiving the IP message stream and recovering the SS7 signaling traffic from the IP message stream and sending the recovered SS7 signaling traffic to a second SS7 signaling link;

transferring the signaling traffic over the IP network by routing the signaling traffic in said IP message stream to a second SG capable of supporting Peer-to-peer communications with the first SG; and the second SG receiving the IP message stream, recovering the SS7 signaling traffic from the IP message stream and sending the recovered SS7 signaling traffic to a second signaling point.

2. The method of claim 1 further comprising the step of using a Network Indicator (NI) and a Destination Point Code (DPC) to determine how to route the SS7 signaling traffic over said IP network.

3. The method of claim 2 wherein the step of using a NI and a DPC to determine how to route the SS7 signaling traffic is preceded by the step of global title translation to reveal the DPC of the signaling traffic.

4. The method of claim 1 further comprising the step of the second SG transmitting the SS7 signaling traffic to a second signaling point.

5. The method of claim 4 further comprising the step of said first and second SGs utilizing Stream Control Transfer Protocol (SCTP) protocol to support peer-to-peer signaling.

6. The method of claim 5 further comprising the step of said first and second SGs using SCTP associations for passing IP traffic.

7. The method of claim 6 further comprising the step of using said SCTP associations for passing management-related messages between said first and second SG.

8. The method of claim 7 further comprising the step of using Stream Control Transfer Protocol (SCTP) associations for passing destination availability messages between said first and second SG.

9. The method of claim 1 further comprising the step of said first SG using signal link connection control part (SCCP) protocol to translate the global title of said SS7 signaling traffic to a destination.

10. The method of claim 9 further comprising the step of routing said SS7 traffic using the destination revealed after global title translation.

11. A signaling gateway (SG) for routing Signaling System 7 (SS7) signaling traffic over an Internet Protocol (IP) backbone comprising:

an SS7 interface to an SS7 signaling link;

an IP interface to an IP signaling link, wherein said IP signaling link; and conversion means, comprising protocol conversion layers between said SS7 interface and said IP interface for converting SS7 signaling traffic received from said SS7 signaling link to IP traffic suitable for transmission over said IP signaling link, said conversion layers including transaction capabilities application part (TCAP), message transfer part 1 (MTP1), MTP2, MTP3 and Message Transfer Part 3-User Adaptation Layer (M3UA) to a second signaling gateway, wherein the second SG receiving the IP message stream, recovering the SS7 signaling traffic from the IP message stream and sending the recovered SS7 signaling traffic to a second SS7 signaling link.

12. The signaling gateway of claim 11 wherein said conversion means comprises SS7 to IP conversion layers.

13. The signaling gateway of claim 12 wherein said SS7 to IP conversion layers includes SCTP.

14. The signaling gateway of claim 13 wherein said SCTP and M3AU permit routing of SS7 signaling traffic over said IP signaling link based on the Network Indicator and Destination Point Code of said traffic.

15. The signaling gateway of claim 13 wherein said SS7 to IP conversion layers include an SCCP protocol layer.

16. The signaling gateway of claim 15 wherein said SCCP protocol layer permits global title translation of said SS7 signaling traffic to a destination point code.

17. A system for routing Signaling System 7 (SS7) signaling traffic over an Internet Protocol (IP) network comprising:

two or more signaling points, each signaling point capable of sending and receiving SS7 signaling traffic over an SS7 network;

a first Signaling Gateway (SG) adapted for receiving SS7 signaling traffic from a first signaling point over said SS7 network, said first SG configured to convert SS7 signaling traffic into an IP message stream utilizing protocol conversion layers, wherein said conversion layers include transaction capabilities application part (TCAP), message transfer part 1 (MTP1), MTP2 and MTP3, Message Transfer Part 3-User Adaptation Layer (M3UA) and to route said IP message stream on said IP network; and a second SG configured to receive said IP message stream via peer-to-peer IP communications over said IP network with said first SG and to recover said SS7 signaling traffic from said IP message stream, said second SG adapted to route recovered SS7 signaling traffic to a specific second signaling point on said SS7 network.

18. The system of claim 17 wherein at least one of said signaling points is an SS7 Signaling Transfer Point (STP).

19. The system of claim 17 wherein at least one of said signaling points is an SS7 Signaling End Point (SEP).

20. The system of claim 19 wherein said SEP is an SS7 Service Switch Point (SSP).

21. The system of claim 19 wherein said SEP is an Mobile Switching Center.

22. The system of claim 17 wherein said first SG is further configured to use a Network Indicator (NI) and a Destination Point Code (DPC) to determine how to route said signaling traffic.

23. The system of claim 22 wherein said first SG uses Global Title Translation to determine said DPC.

24. The system of claim 17 wherein said first and second SG share the same Destination Point Code (DPC) thereby conserving DPCs.

25. The system of claim 17 wherein said first SG uses a Stream Control Transfer Protocol (SCTP) to transport said IP message stream over said IP network.

26. The system of claim 25 wherein said first SG uses a Nodal Interworking Function (NIF) layer to exchange SS7 signaling traffic between said Message Transfer Part (MTP) 3 layer and said M3UA layer.

27. The system of claim 17 wherein said second SG uses a Stream Control Transfer Protocol (SCTP) to receive said IP message stream over said IP network.

28. The system of claim 17 wherein said second SG uses said M3UA to recover said SS7 signaling traffic from said IP message stream.

29. The system of claim 28 wherein said second SG uses a Nodal Interworking Function (NIF) layer to exchange SS7 signaling traffic between a Message Transfer Part (MTP) 3 layer and a Message Transfer Part 3-User Adaptation Layer (M3UA) layer.

30. The system of claim 17 wherein said first SG is configured to recover SS7 signaling traffic from said IP message stream.

31. The system of claim 17 wherein said second SG is configured to convert SS7 signaling traffic into said IP message stream.

* * * * *

UNITED STATES PATENT AND TRADEMARK OFFICE
CERTIFICATE OF CORRECTION

| | | |
|---|---|---|
| PATENT NO. | : 6,920,144 B2 | Page 1 of 1 |
| APPLICATION NO. | : 09/808677 | |
| DATED | : July 19, 2005 | |
| INVENTOR(S) | : Dennis Niermann | |

It is certified that error appears in the above-identified patent and that said Letters Patent is hereby corrected as shown below:

Delete Claim 1 in its entirety and replace with the following

1. A method of routing Signaling System 7 (SS7) signaling traffic over an Internet Protocol (IP) network comprising the steps of:
    a first signaling gateway (SG) receiving SS7 signaling traffic from a first signaling point;
    converting said SS7 signaling traffic to an IP message stream utilizing protocol conversion layers, wherein said conversion layers include transaction capabilities application part (TCAP), message transfer part 1 (MTP1), MTP2, and MTP3 Message Transfer Part 3-User Adaptation Layer (M3UA) to a second signaling gateway, wherein
    "the second SG receiving the IP message stream and recovering the SS7 signaling traffic from the IP message stream and sending the recovered SS7 signaling traffic to a second SS7 signaling link;"
    transferring the signaling traffic over the IP network by routing the signaling traffic in said IP message stream to a second SG capable of supporting peer-to-peer communications with the first SG; and
    the second SG receiving the IP message stream, recovering the SS7 signaling traffic from the IP message stream and sending the recovered SS7 signaling traffic to a second signaling point.

Signed and Sealed this

Second Day of January, 2007

JON W. DUDAS
*Director of the United States Patent and Trademark Office*